(12) United States Patent
Kuramoto et al.

(10) Patent No.: US 7,046,474 B2
(45) Date of Patent: May 16, 2006

(54) DATA STORAGE DEVICE AND ACTUATOR CONTROL METHOD

(75) Inventors: Kenichi Kuramoto, Kanagawa (JP); Takanori Kawakami, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/957,011

(22) Filed: Sep. 30, 2004

(65) Prior Publication Data

US 2005/0078404 A1 Apr. 14, 2005

(30) Foreign Application Priority Data

Oct. 9, 2003 (JP) ............................. 2003-350279

(51) Int. Cl.
*G11B 21/02* (2006.01)
*G11B 5/596* (2006.01)

(52) U.S. Cl. ...................................... 360/75; 360/78.04
(58) Field of Classification Search ..................... None
See application file for complete search history.

(56) References Cited

U.S. PATENT DOCUMENTS 6,765,746 B1 * 7/2004 Kusumoto ................... 360/75

FOREIGN PATENT DOCUMENTS

JP 2000-021073 1/2000

* cited by examiner

*Primary Examiner*—Andrew L. Sniezek
(74) *Attorney, Agent, or Firm*—Townsend and Townsend and Crew LLP

(57) ABSTRACT

Embodiments of the invention prevent the magnetic head from dropping to the magnetic disk when it is retracted. If the power supply Vcc to the drive is interrupted, a power supply voltage detecting section detects that the power supply to the drive is interrupted. A control section sets switches to the ON state in order to discharge the charged retract capacitor and supply the discharge current to a voice coil. The control section retains the switches in the ON state for a period which is determined based on the discharge period specifying control data stored in a register and the count signal from a counter. A voice coil motor, to which the current is supplied, turns the actuator in the unloading direction to retract the actuator to the ramp.

20 Claims, 9 Drawing Sheets

```
S701: Acquire Temperature Data
   ↓
S702: Determine Count Number by Referring to Temperature-Count Number Table
   ↓
S703: Generate Count Number
   ↓
S704: Output Count Number to Retract Driver
```

FIG.8

Temperature-Count Number Table

| Temperature (°C) | Count Number |
|---|---|
| ~5 | 2 |
| 5~15 | 1 |
| 15~60 | 2 |
| 60~ | 1 |

| Temperature (°C) | Head Position (Track Number) | | |
|---|---|---|---|
| | ~10000 | 10000~20000 | 20000~ |
| ~5 | 2 | 2 | 3 |
| 5~15 | 1 | 1 | 2 |
| 15~60 | 1 | 2 | 2 |
| 60~ | 1 | 1 | 1 |

DATA STORAGE DEVICE AND ACTUATOR CONTROL METHOD

CROSS-REFERENCES TO RELATED APPLICATIONS

Not Applicable

BACKGROUND OF THE INVENTION

The present invention relates to data storage devices and actuator control methods. More particularly, the invention relates to a data storage device and actuator control method for providing actuator control suited for retraction.

Various apparatus using optical disks, magnetic tapes and other types of media have been known as information recording and reproducing apparatus. Among them, the hard disk drive is popular as a storage device for computers so widely that it is one of the storage devices indispensable for today's computer systems. Further, not limited to computers, the hard disk drive is increasingly enlarging its area of application due to its superior characteristics including moving picture recording and reproducing apparatus and removable memories used in car navigation systems, digital cameras, etc.

A hard disk drive has a magnetic disk on which data is recorded, a spindle motor which rotates the magnetic disk, a magnetic head which reads/writes data to/from the magnetic disk and an actuator on which the magnetic head is fixed. Driven by a voice coil motor (VCM), the actuator is turned about a pivot to move the magnetic head. To read/write data, the actuator moves the magnetic head to the data zone on the surface of the rotating magnetic disk. The magnetic head has a recording/reproducing thin film element and a slider. Air between the rotating magnetic disk and the slider's ABS (Air Bearing Surface) facing the magnetic disk causes a pressure due to its viscosity. As a result of this pressure balanced with a pressure applied by the actuator toward the magnetic disk, the magnetic head flies above the magnetic disk with a certain gap therefrom.

When the magnetic disk ceases to rotate, the magnetic head is saved from the data zone in order to prevent the magnetic head from contacting the surface of the magnetic disk, which would cause flaws on the data zone or make it impossible to rotate the magnetic disk due to the adhering magnetic head. As a typical method for moving the magnetic head into the data zone on the disk and saving the magnetic head from the data zone, the ramp load approach is known. In the ramp load method, a ramp located near the magnetic disk is used to save the magnetic head. When the magnetic head is unloaded, the actuator is turned toward the ramp to rest the magnetic head thereon. During the unload, the actuator slides up an inclined surface of the ramp and reaches a flat parking surface of the ramp. During the load, the actuator kept on the parking surface slides down the inclined surface in the loading direction to leave the ramp and move to above the disk surface. The hard disk drive is also provided with an inner crash stop and outer crash stop which respectively define the innermost and outermost limits up to which the actuator can be turned over the magnetic disk. The outer crash stop prevents the magnetic head from passing through the ramp.

It is possible that power supply to the hard disk drive is interrupted while the magnetic head is above the rotating magnetic disk. Since the magnetic disk may have trouble as mentioned above if the magnetic disk contacts the magnetic disk, the magnetic head is saved to the ramp if the power supply is interrupted. While the power supply is ON, the actuator can be moved by controlling the VCM driver. If the power supply is interrupted, the magnetic head is unloaded to the ramp by a retract driver. A typical retract driver unloads the magnetic head by rectifying the back electromotive force of the spindle motor and supplying the rectified current to the VCM (Voice Coil Motor). In the case of a small hard disk drive not larger than 1.8 inches, however, it is usual that a voltage accumulated in a capacitor is utilized to drive the VCM since it is not possible to obtain a sufficiently large back electromotive force from the spindle motor.

To allow safer head retract control in such a hard disk drive provided with a retract driver, a technique is proposed which performs head retract control according to the head position when power supply to the driver is interrupted (see Japanese Patent Laid-open No. 2000-21073). In this hard disk drive, a switch is formed between the drive's general power supply line and a power supply line which supplies power to an unload control circuit including a CPU. If the interruption of the power supply is detected by a power supply interruption detecting circuit, the switch separates the power supply lines from each other so that a power supply voltage is applied to the unload control circuit from a capacitor connected to its power supply line. Normally, the CPU periodically determines a head retract control quantity as well as performing head control concurrently. If the interruption of the power supply is detected, the CPU gives the last determined control quantity to the VCM driver via a D/A converter, which drives the voice coil motor to retract the head to a predetermined retract position.

BRIEF SUMMARY OF THE INVENTION

The retracting operation settles the actuator as a result of its collision with the outer crash stop. Thus, if the bounce coefficient of the outer crash stop is large, the actuator may greatly bounce off the outer crash stop, letting the magnetic head drop off the ramp to the magnetic disk. In particular, if the disk size is small or the rotation speed is low, it may be impossible to obtain a sufficiently large back electromotive force from the voice coil motor to retain the actuator on the ramp by acting against the repelling force given to the actuator by the collision. Using a capacitor to supply power to the retract driver is also not free from this problem since the charge accumulated in the capacitor is limited. Utilizing the back electromotive force together with this capacitor cannot always obtain enough power. Thus, the bounce coefficient of the outer crash stop is required to be small. To reduce the bounce coefficient of the outer crash stop, the outer crash stop is formed using an elastic body.

However, the inventors have found that the actuator's bouncing amount from the outer crash stop varies greatly depending on the environmental conditions, in particular, on the temperature. For a miniaturized slider, dependence of the actuator's bouncing amount on the temperature is significant in particular. Aimed at improving hard disk drives in seek speed and vibration/shock resistance or in compactness, magnetic head sliders are becoming smaller. Making a slider smaller reduces the buoyant force caused by the viscosity of air, resulting in reducing the pressing force given to the magnetic head by the actuator.

The actuator, due to the frictional force between the tab and the ramp surface, is stopped in contact with the parking surface. Making the slider smaller, i.e., lighter reduces the pressing force (gram load), resulting in a smaller frictional force between the tab and the ramp surface. The smaller the frictional force becomes, the more the bouncing amount depends on the temperature. In particular, if the load given to the magnetic head by the actuator is not larger than 0.7 gf, this dependence has significance. If the bouncing amount exceeds a certain level, the magnetic head may leave the ramp and drop to the magnetic disk. On the other hand, if the retracting drive force is too small, the tab cannot climb over the inclined surface of the ramp, which lets the magnetic head drop to the magnetic disk.

Embodiments of the present invention effectively control the action of the actuator, prevent the magnetic head from returning to the data zone on the magnetic disk from the retract zone after the actuator is rebounded, prevent the magnetic head from dropping to the magnetic disk in a ramp load type magnetic disk drive, and effectively control the retracting operation according to the temperature.

According to a first aspect of the present invention, there is provided a data storage device having a medium to store data thereon, which comprises: a head to read data from the medium and/or write data to the medium; an actuator which holds the head and operates so as to move the head to a target position; a temperature detecting section to detect temperature; and an actuator control section which controls power to operate the actuator on the basis of the temperature detected by the temperature detecting section. With this, the operation of the actuator can be controlled effectively.

It is preferable to configure the actuator control section in such a manner that in an operation to move the actuator to a retract region when data read/write is not done by the head, the power to operate the actuator is controlled based on the detection temperature detected by the temperature detecting section. With this, the actuator's movement to the retract region can be controlled effectively.

It is preferable to configure the data storage device in such a manner that a ramp is formed in the retract region to stop the actuator thereon; and in the operation to move the actuator to the retract region, the actuator control section controls the power to operate the actuator so as to stop the actuator on the ramp on the basis of the detection temperature. With this, the actuator can be retracted to the ramp more surely. It is also preferable to configure the data storage device in such a manner that a crash stop is provided against which the actuator collides in the operation to move the actuator to the retract region; and in the operation to move the actuator to the retract region, the actuator control section controls the power to operate the actuator on the basis of the detection temperature so that the actuator is stopped on the ramp after bounded by the crash stop. With this, the actuator can be retracted to the ramp more surely by coping with the actuator's temperature-dependent bouncing from the crash stop.

It is preferable to configure the data storage device in such a manner that the actuator has a voice coil which swings the actuator around a pivot when a current is supplied to the voice coil; and the actuator control section controls the power to operate the actuator on the basis of the detection temperature, by changing a time period for which the current is to be supplied to the voice coil. With this, the power to operate the actuator can be controlled effectively. It is also preferable to configure the data storage device in such a manner that a capacitor is provided to accumulate an electric charge therein; and the actuator control section controls the current to be supplied to the voice coil from the capacitor. With this, the operation of the actuator can be controlled more surely since the power required to operate the actuator can be supplied. In addition, it is preferable to configure the data storage device in such a manner that a control data generating section is provided which based on the detection temperature detected by the temperature detecting section, generates control data to control a time period for which a current is to be supplied to the voice coil; the actuator control section has a counter and a memory unit to store the control data therein; and based on a count number determined according to the control data and a count signal from the counter, the actuator control section controls the time period for which the current is supplied to the voice coil. With this, the actuator can be controlled with less power. Further it is preferable to configure the data storage device in such a manner that the control data is generated and stored in the memory unit in the actuator control section before the actuator is moved from the retract region to the data storage region on the medium. This more surely prevents the data storage device from getting out of control due to the set control data.

It is preferable to configure the data storage device in such a manner that in a retracting operation to move the actuator to the refuge region if the power supply to the data storage device is interrupted, the actuator control section controls the power to operate the actuator on the basis of the detection temperature detected by the temperature detecting section. With this, the actuator's movement to the refuge location can be controlled effectively in the retracting operation.

Preferably, the actuator is driven with a first operation power in a first temperature range; driven with a second operation power smaller than the first operation power in a second temperature range higher than the first temperature range; and driven with a third operation power larger than the second operation power in a third temperature range higher than the second temperature range. Further it is preferable that the actuator is driven with a fourth operation power smaller than the third operation power in a fourth temperature range higher than the third temperature range. With this, the operation of the actuator can be controlled effective according to the change of temperature.

It is preferable that the actuator is driven with a first operation power in a first temperature range; driven with a second operation power larger than the first operation power in a second temperature range higher than the first temperature range; and driven with a third operation power smaller than the second operation power in a third temperature range higher than the second temperature range. With this, the operation of the actuator can be controlled effectively according to the change of temperature.

It is preferable to configure the data storage device in such a manner that a head position detecting section is provided to detect the position of the head; and the actuator control section controls the power to operate the actuator on the basis of the detection temperature detected by the temperature detecting section and the head position detected by the head position detecting section. With this, the operation of the actuator can be controlled effectively.

According to a second aspect of the present invention, there is provided an actuator control method for moving an actuator to a retract position in a data storage device in which the actuator holds and moves a head to a target position, comprising the steps of: detecting temperature; based on the detected temperature, determining the power to operate the actuator; and driving the actuator with the determined operation power to move the actuator to the retract position. With this, the operation of the actuator can be controlled effective according to the change of temperature.

It is preferable that the step of determining the power to operate the actuator determines a time period for which a current is to be supplied. With this, the power to operate the actuator can be controlled effectively. Alternately, it is possible that the actuator control method further comprises the step of detecting the interruption of the power supply to the data storage device; and the actuator is moved to the retract position if the interruption of the power supply to the data storage device is detected. With this, the operation of the actuator can be controlled effectively when the power supply is interrupted.

It is preferable that the actuator control method further comprises the step of detecting the head position of the head; and the power to operate the actuator is determined based on the detected temperature and head position. With this, the operation of the actuator can be controlled more effectively.

It is preferable that the step of determining the power to operate the actuator includes the step of referring to a table stored in a memory and determining control data associated therein with the detected temperature; said step of driving the actuator includes the step of acquiring a counter signal from a counter and the step of acquiring the control data; and the actuator is driven for a time period determined based on the counter signal and control data. With this, the actuator can be controlled with less power.

According to a third aspect of the present invention, there is provided a data storage device having a medium to store data thereon, comprising: a head to read data from the medium and/or write data to the medium; an actuator which holds the head and is turned so as to move the head to a target position; a ramp to which the actuator is retracted; a crash stop to restrict a turning range of the actuator; a temperature detecting section to detect temperature; and an actuator control section which in an operation to retract the actuator to the ramp by turning the actuator against the crash stop if the power supply to the data storage device is interrupted, controls the power to operate the actuator on the basis of the temperature detected by the temperature detecting section so that the actuator is stopped on the ramp. With this, the operation of the actuator can be controlled effectively according to the change of temperature.

DETAILED DESCRIPTION OF THE INVENTION

Specific embodiments of the present invention will be described below. Although embodiments of the present invention are described, the present invention is not limited to these embodiments. To facilitate clear understanding, omission and simplification are done, where appropriate, in the following description and in the drawings. Those skilled in the art can easily make modifications, additions and alterations to the individual elements of these embodiments without departing from the scope of the present invention.

Figure 1:
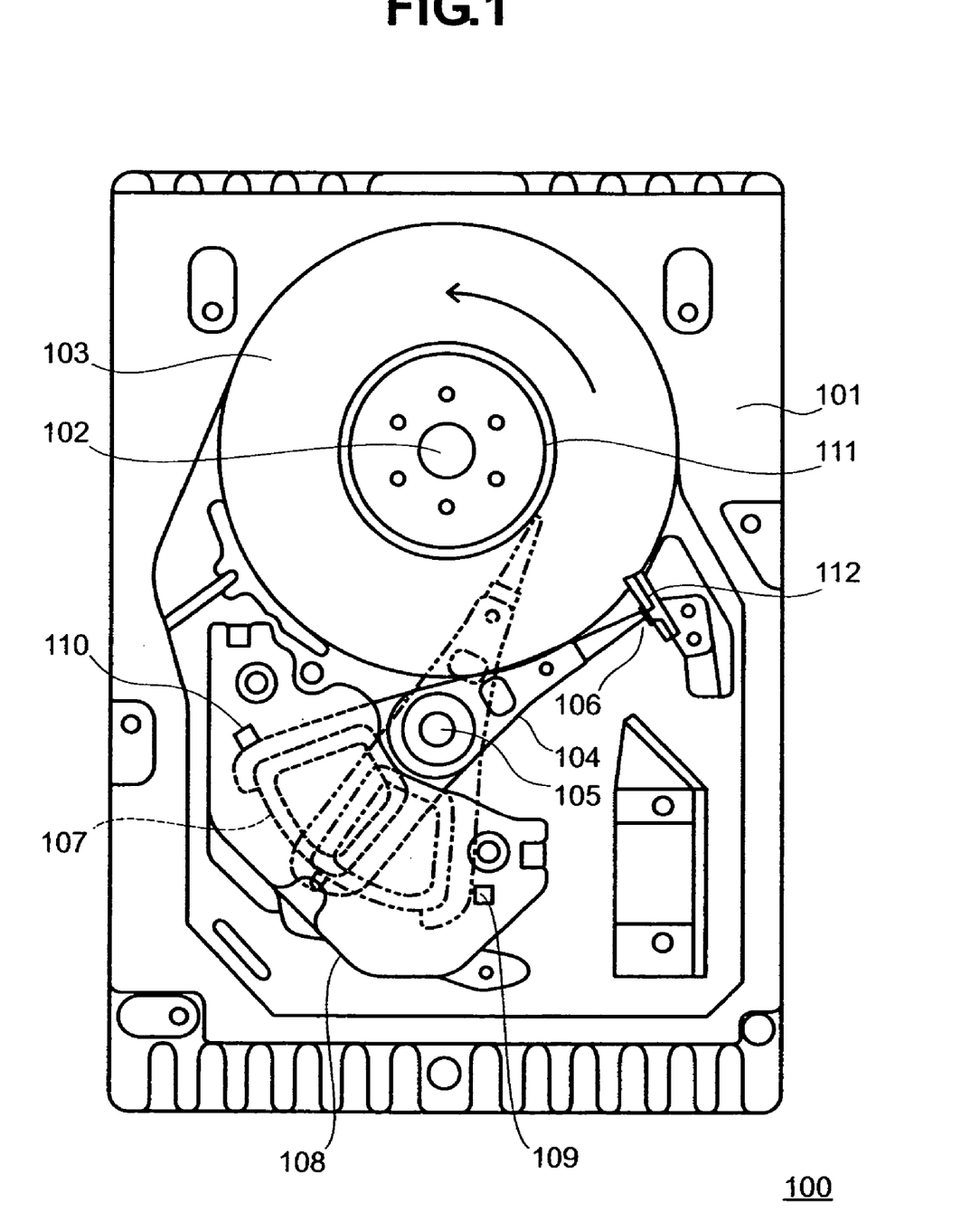
FIG. 1 shows the general configuration of a hard disk drive according to an embodiment.

FIG. 1 shows the configuration of an embodiment of a hard disk drive 100 in accordance with the present invention. The hard disk drive 100 has each component accommodated in a disk enclosure. The disk enclosure is composed of a base 101 and a cover (not shown). The base 101 is a box whose top is open. This top opening is closed by the cover. In the disk enclosure, a spindle motor 102 is located on the base 101 and one or a plurality of magnetic disks 103 are held by the spindle shaft of the spindle motor 102. The magnetic disk 103 is rotated by the spindle motor at a predetermined rotation speed.

An actuator 104 is located on the base 101. The actuator 104 is secured to the base 104 for turning around a pivot 105. Magnetic heads 106 are mounted at the front end of the actuator 104. The magnetic heads 106 write and read data to and from the magnetic disk 103 as an example of a medium. The magnetic heads 106 have recording/reproducing thin film elements and a slider. The actuator 104 is provided with a voice coil 107 at the rear end. On the base 101, a stator 108 comprising a magnet and yoke is mounted so as to face the voice coil 107. The voice coil 107 and stator 108 constitute a voice coil motor. The voice coil motor turns the actuator 104 around the pivot 105 by utilizing the magnetic force that is generated by a current supplied to the voice coil 107.

An inner crash stop 109 and outer crash stop 110 are mounted on the base 101 to define a range of turning (turning angles) for the actuator 104 by respectively determining the innermost and outermost limits as viewed from the magnetic disk 103. The inner crash stop 109 not only has a function to prevent the actuator 104 from touching a top clamp 111 but also contributes to the positioning of the actuator 104 when servo information is written to the magnetic disk. The top clamp secures the magnetic disk 103 to the spindle motor 102. On the other hand, the outer crash stop 110 limits the outward turning of the actuator 104 from the magnetic disk 103, preventing the magnetic heads 106 from passing through a ramp 112 formed in a retract zone to which the magnetic heads 106 is retracted for unloading. In the retracting operation, the actuator 104 stops as a result of colliding with the outer crash stop 110. Thus, the elastic material and structure of the outer crash stop 110 are chosen appropriately so as to reduce the bounce coefficient and facilitate control according to the bounce coefficient varying depending on the temperature.

Figure 2:
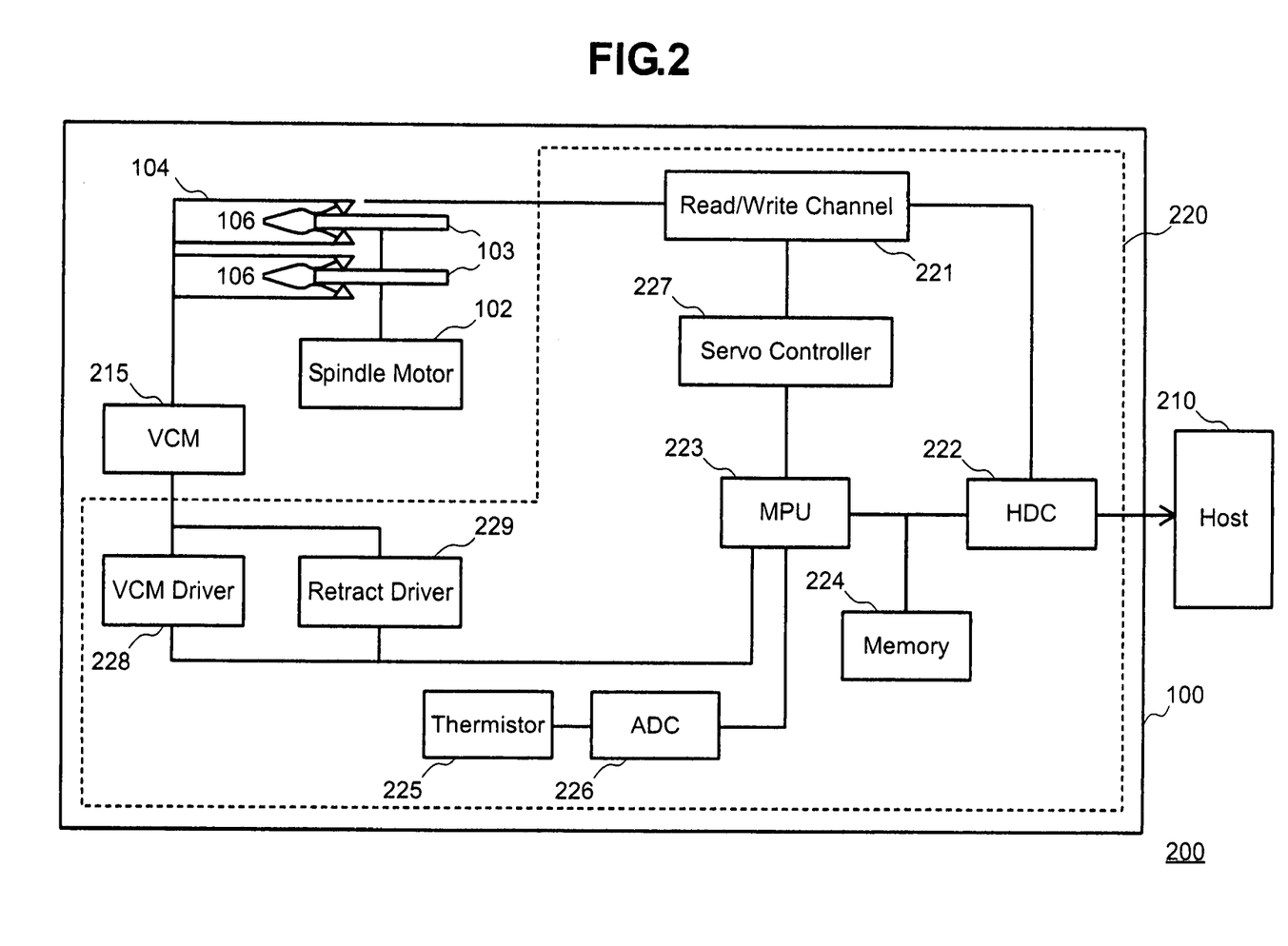
FIG. 2 shows the logical configuration of the hard disk drive in the embodiment.

FIG. 2 shows the general configuration of a data processing system 200 of the present embodiment including the hard disk drive 100. The data processing system 200 has a host 210, which is a computer, digital camera or the like to perform data processing, and the hard disk drive 100, which is a magnetic recording device to store data transmitted from the host 210. The hard disk drive 100 has one or a plurality of magnetic disks 103, magnetic heads 106 associated respectively with the recording surfaces of the magnetic disks 103 and a controller 220 which controls the actuator 104 and other elements to write and read data to and from each magnetic disk 103.

Host user data transmitted from the host 210 is sent to a magnetic head 106 by the controller 220 after necessary processing is given. The magnetic head 106 writes data to a recording surface of a magnetic disk 103 according to the obtained write signal. On the other hand, the read signal read out from the magnetic disk 103 by a magnetic head is transmitted to the host 210 by the controller 220 after necessary processing is given.

The magnetic disk 103 is a non-volatile medium having magnetic layers which are magnetized to record data. On either surface of the magnetic disk 103, a plurality of concentric tracks are formed, and further, each track is circularly divided into a plurality of sectors. Each surface of the magnetic disk 103 has a plurality of servo data storing areas, which are typically arranged in the radial direction. In each sector, both servo data and user data storing areas are formed. Information about the position of the magnetic head 106 can be obtained by reading servo data by the magnetic head 106. Servo data comprises track data providing track number information, sector data providing sector number information and a burst pattern. The magnetic head 106 moves over the magnetic disk 106 in the radial direction thereof when the actuator 104 is turned. This allows the magnetic head 106 to access a target track.

The hard disk drive 100 has two magnetic heads 106 for each magnetic disk 103. The two magnetic heads 106 are associated respectively with the top and bottom surfaces of the magnetic disk 103. Each magnetic head 106 is unloaded to the ramp located outside the magnetic disk 103 when no data write/read is done. In particular in case the power supply to the drive is interrupted during operation, a retracting operation is done to retract the magnetic head 106. This retracting operation will be described later. Note that it is also possible to form the ramp 112 on the inner side of the magnetic disk 103. Also note that the magnetic heads 160 either write data to the magnetic disks 103 or read servo/user data from the magnetic disks 103.

As shown in FIG. 2, the controller 220 includes a read/write channel 221, a hard disk controller (HDC) 222, a microprocessor unit (MPU) 223, a memory 224, a thermistor 225 for temperature detection, an AD converter (ADC) 226 to AD-convert the signal from the thermistor 225, a servo controller 227, a voice coil motor driver (VCM driver) 228 and a retract driver 229.

The read/write channel 221 executes read/write processing on the data obtained from the host 210. In the write processing, the read/write channel encodes the write data supplied from the hard disk controller 222, converts the encoded write data to a write signal (current) and supplies the write signal to a magnetic head 106. The magnetic head 106 writes data to the magnetic disk 103 according to the obtained signal. In the read processing, the read/write channel 221 extracts data from a read signal supplied from the magnetic head 106 and decodes the data. The read data, after decoded, is supplied to the hard disk controller 222.

Provided with a function to interface with the host 210, the hard disk controller 222 receives user data and commands, such as read and write commands, which are transmitted from the host 210. The received user data is given ECC processing and other necessary processing and then transferred to the read/write channel 221. In addition, the data read from the magnetic disk 103 is obtained from the read/write channel 221 and transmitted to the host 210 after given necessary processing.

According to the firmware loaded into the memory 224, the MPU 223 operates to generally control the hard disk drive 120, including positioning control on the magnetic head 106, interface control and defect management, and execute data-related necessary processing. In particular in the present embodiment, the MPU 223 generates control data required to control the retracting operation as described later. The data to be required for control and data processing as well as the firmware to be executed on the MPU 223 are loaded into the memory 224 from a magnetic disk 103 or ROM (not shown) when the hard disk drive 100 is started.

The digital data read out by the read/write channel 221 includes servo data as well as user data from the host 210. The servo controller 227, which is an example of a head position detecting section, extracts servo data from the read data obtained from the read/write channel 221. The servo data comprises track data, sector data and a burst pattern. The extracted servo data is transferred to MPU 223 from the servo controller 227. According to the firmware, the MPU 223 performs position control processing on the magnetic head 106 by using the servo data. Control data is transferred to the VCM driver 228 from the servo controller 227. The VCM driver 228 supplies drive current to the VCM 215 according to the control data.

The thermistor 225, which is an example of a temperature detection section, generates a temperature signal according to the detected temperature. After converted from an analog signal to a digital signal by the AD converter 226, the temperature signal is used by the MPU 223 for processing according to the firmware. The temperature data is used in determining the amount of current applied to the coil of the magnetic head 106 during the write operation or the power to run the actuator or the total charge supplied to the VCM 215 during the retracting operation. Use of the temperature data for the retracting operation will be described later. Note that the thermistor for temperature detection may be replaced by another type of thermoelectric element.

The retract driver 229 drives the VCM 215 if the power supply to the drive is interrupted. Driven by the retract driver 135, the VCM 215 turns the actuator 104 to unload the magnetic head 106 before the rotation speed of the magnetic disk 103 slows down to a certain level. By retracting the magnetic head 106 to the ramp 112, it is possible to prevent the magnetic head 106 from touching the magnetic disk 103, which would get the hard disk drive 100 out of order. In this embodiment, the retracting operation is controlled based on the temperature detected by the thermistor 225 as described above. This allows the movement of the actuator 104 to be controlled so as to surely stop the magnetic head 104 at the ramp 112. For example, the retract driver 229 and the MPU 223 can operate to function as an actuator control section.

Figure 3:
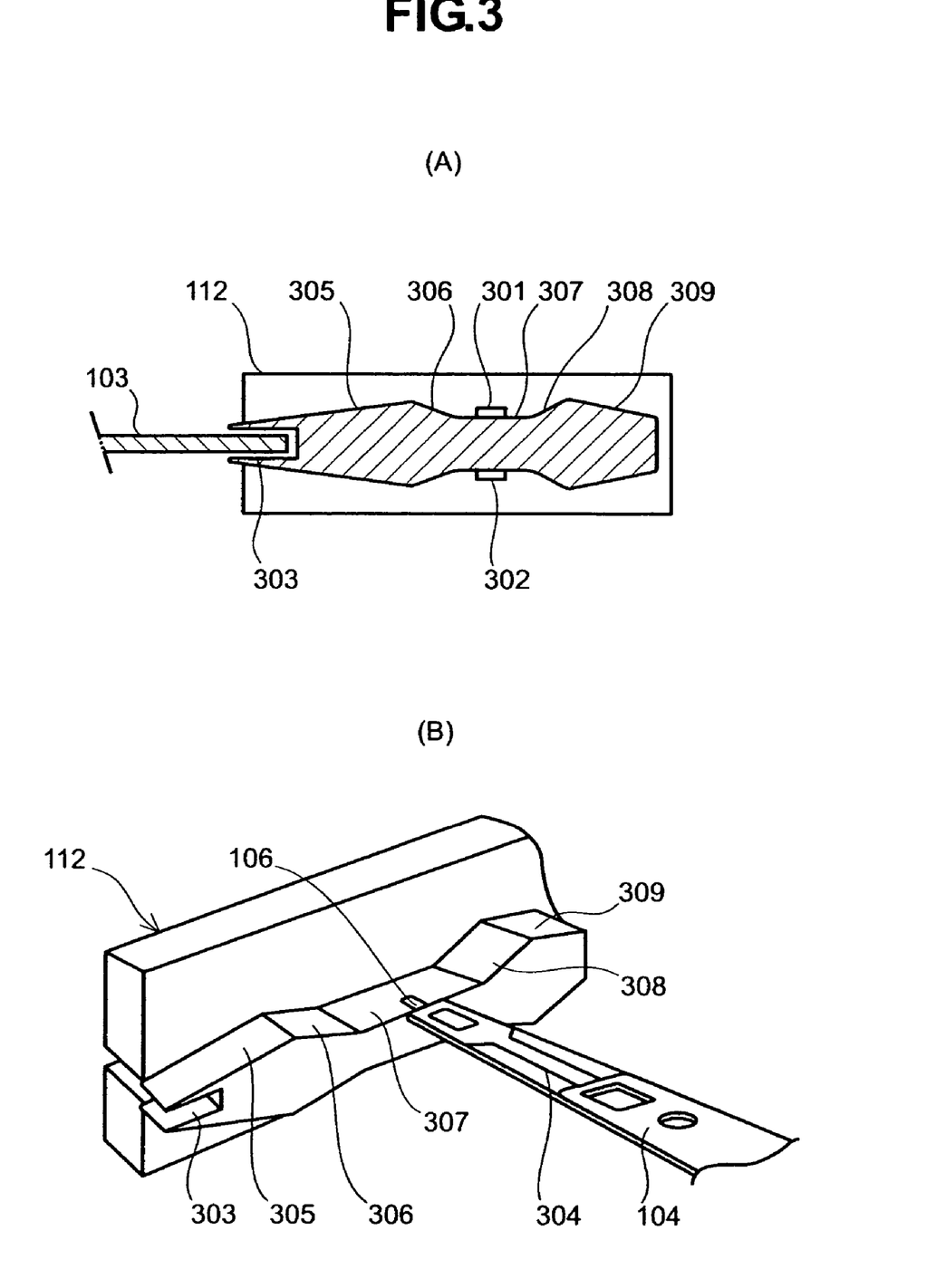
FIG. 3 shows the configuration of a ramp in the embodiment.

FIGS. 3(A) and 3(B) show a configuration of the ramp 112 according to the present embodiment. In FIGS. 3(A) and 3(B), the actuator 104 is unloaded in a retract position. Note that the tabs 301 and 302 of two actuators 104 are shown in FIG. 3(A), whereas one actuator 104 is shown in FIG. 3(B). The ramp 112 is formed with a slit 303 through which the outer circumference of the rotating magnetic disk 103 passes. In addition, the ramp 112 has an inclined surface 305, an inclined surface 306, a parking surface 307, an inclined surface 308 and an inclined surface 309. When the actuator 104 is unloaded in the retract position, the tab 301 is in contact with the parking surface 307 and the rear end of the actuator 104 is in contact with or near the outer crash stop 110. Note that the inclined surfaces 308 and 309 are formed so that the tab 301 can be inserted from the rear of the ramp 112 (opposite to the slit 303) when the drive is assembled.

To load the actuator 104, current is supplied to the voice coil 107 to operate the VCM 215. The actuator 104 is turned toward the inner side of the magnetic disk 103 to move the magnetic head 106 to the rotating magnetic disk 103. Air between the rotating magnetic disk 103 and the slider's ABS (Air Bearing Surface) facing the magnetic disk 103 causes a pressure due to its viscosity. As a result of this pressure balanced with a pressure applied by the suspension 304 of the actuator 104 toward the magnetic disk 103, the magnetic head 304 flies above the magnetic disk 103 with a certain gap spaced therebetween.

To unload the actuator 104, the actuator 104 is swung toward the outer side of the magnetic disk 103 to move the magnetic head 106 to the ramp 106. The tab 301 touches the inclined surface 305 of the ramp 112 and slides on the inclined surfaces 305 and 306 and the parking surface 307 in the unloading direction. In the normal unloading operation, it is typical that the velocity of the actuator 104 is controlled based on the back electromotive force detected from the voice coil 107 so that the tab 301 passes through the inclined surfaces 305 and 306 and stops in contact with the parking surface 307 formed as a retract position.

In case the power supply to the hard disk drive 100 is interrupted while the magnetic head 106 exists above the rotating magnetic disk 103, the retracting operation is done to retract the actuator 104 and magnetic head 106 to the ramp 112. In this case the actuator 104 and magnetic head 106 are unloaded to the ramp 112 by the retract driver 229, whereas the actuator 104 is controlled by the VCM driver 228 when the power supply is in the ON state. In the retracting operation to unload the actuator 104 to the ramp 112, the tab 301 of the actuator 104 touches the inclined surface 305 of the ramp 112 and slides on the inclined surfaces 305 and 306 and the parking surface 307 in the unloading direction. Then, the actuator 104 collides against the outer crash stop 110. As the bouncing force given by the outer crash stop 110 is balanced with the frictional force between the tab 301 and the surface of the ramp 112, the actuator 104 stops on the ramp 112.

Figure 4:
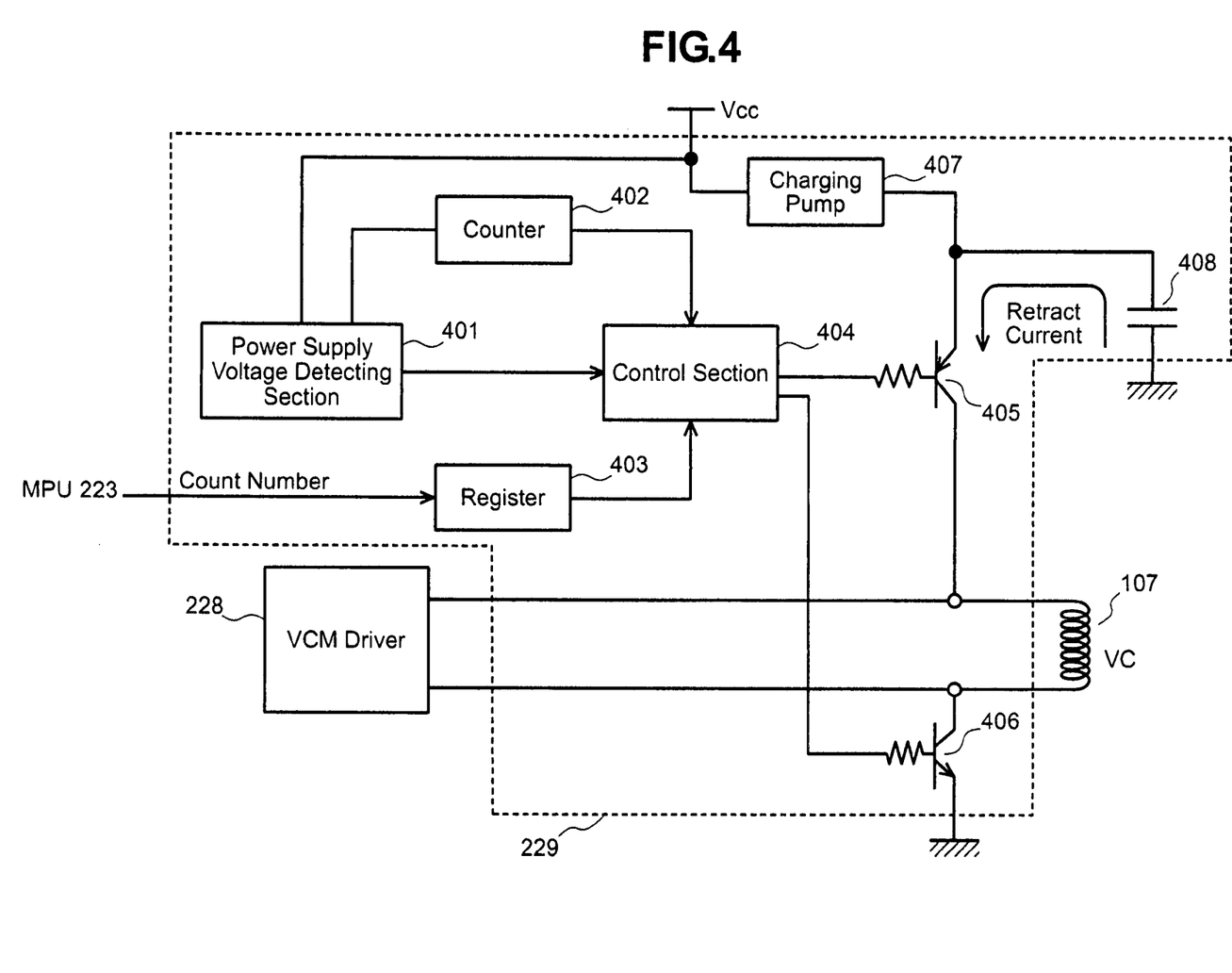
FIG. 4 shows the logical configuration of the ramp in the embodiment.

FIG. 4 is a block diagram showing a logical configuration of the retract driver 229 in the present embodiment. In FIG. 4, the retract driver 229 includes a power supply voltage detecting section 401, a counter 402, a register 403, a control section 404, switches 405 and 406, a charge pump 407 and a retract capacitor 408. While the drive's power supply voltage Vcc is in the ON state, the retract driver 229 charges the retract capacitor 408 with a boosted voltage generated by the charging pump 407. If the drive's power source voltage Vcc is interrupted, the VCM driver 408 ceases to operate and the power supply voltage detecting section 401 detects the interruption of the drive's power supply voltage Vcc. The control section 404 sets the switches 405 and 406 to the ON state in order to discharge the retract capacitor 408 which was charged with the boosted voltage and supply the discharge current to the voice coil 107. The control section 404 sets the switches 405 and 406 to the ON state for a period (hereinafter denoted as the retract period) determined based on the control data stored in the register 403 and the counter signal from the counter 402. With this, the discharge current is supplied to the voice coil. The VCM 218 that has received the current turns the actuator 104 in the unloading direction to retract the actuator 104 to the ramp 112.

While the power supply to the drive is in the ON state, the charging pump 407 boosts the power supply voltage Vcc to generate the boosted voltage (e.g., 3×Vcc). Provided between the charging pump 407 and the ground, the retract capacitor 408 is charged with the boosted voltage while the power supply to the drive is in the ON state. If the power supply to the drive is interrupted, the discharge current is supplied to voice coil 107 as the retract current since the switches 405 and 406 are set to the ON state. Note that the voltage can also be boosted by a DC-DC converter or the like instead of the charging pump 407.

The switch 405 is connected to the charging pump 407 and one end of the voice coil 107, whereas the switch 406 is located between the other end of the voice coil 107 and the ground. Controlled by the control section 404, the switches 405 and 406 are set to the OFF state when the power supply to the drive is in the ON state, whereas they are set to the ON state when the power supply to the drive is interrupted. If the switches 405 and 406 are set to the ON state, they discharge the retract capacitor 407 to supply the retract current to the voice coil 107. The power supplied by the retract capacitor 407 is required to run the retract driver 229 after the power supply is interrupted. This retracting operation can be executed with a small amount of power consumption since the retracting operation is controlled by the retract driver without the necessity of operating the MPU.

The power supply voltage detecting section 401 detects the interruption of the power supply to the drive, it supplies a detection signal to the control section 404. The counter 402 starts counting in response to the interruption of the power supply. The control section 404 controls the switches 405 and 406 based on the discharge period control data set in the register 403 and the counter signal from the counter. One specific example of the discharge period control data is a count number. In the register 403, a count number obtained from the MPU 223 is stored. By referring to the count number obtained from the register 403 and the counter signal from the counter 402, the control section 404 determines the discharge period for which the switches 405 and 406 are to be set to the ON state. For example, if 2 is stored in the register 403, the switches 405 and 406 are set to the ON state until the second cycle of the counter signal is obtained and set to the OFF state after the period. While the switches 405 and 406 are in the ON state, the retract current is supplied to the voice coil 107.

Figure 5:
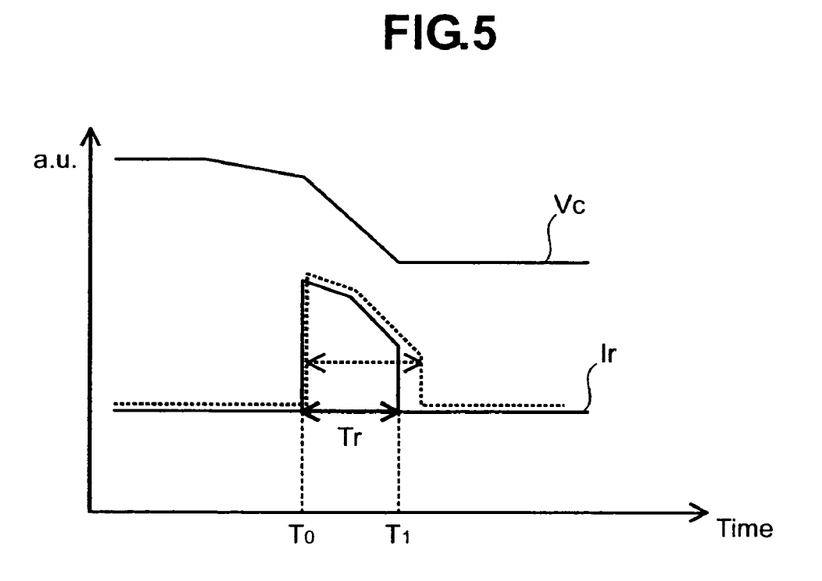
FIG. 5 shows how the retract current and retract capacitor voltage change with time during a retracting operation in the embodiment.

FIG. 5 shows the relations among the retract current (Ir), the retract current discharge period (retract period Tr) and the voltage (Vc) of the retract capacitor 407. As indicated by solid lines, the switches 405 and 406 are set to the ON state at timing T0 to start the retract current Ir flowing through the voice coil 107. The retract current Ir gradually reduces and is stopped at timing T1 when the switches 405 and 406 are set to the OFF state. The voltage of the retract capacitor 407 begins to gradually fall immediately before the retract period since the power is supplied to the retract driver 229. Then the voltage begins to rapidly fall at timing T0 when the current begins to be supplied to the voice coil 107. After the discharge period is terminated (T1), the voltage of the retract capacitor 407 is kept at a constant level.

The power to run the actuator 104 is calculated by integrating the current with respect to time. Accordingly, to use larger power for the retraction, the retract period (Tr) for which the retract current is to be discharged is set longer as indicated by a dotted line in FIG. 5. By changing the retract current discharge period, the control section 404 can effectively control the power which retracts the actuator 104 to the ramp in the retracting operation. This makes it possible to more surely retract the magnetic head 106 to such a retract position as the ramp 112 by preventing the magnetic head 106 from dropping to the magnetic disk 106. Note that the control section 404 may also be configured in such a manner that it determines the count number by performing predetermined arithmetic processing on the control data stored in the register 403. For example, the retract period can be determined by adding the set count number to a default count number.

Figure 6:
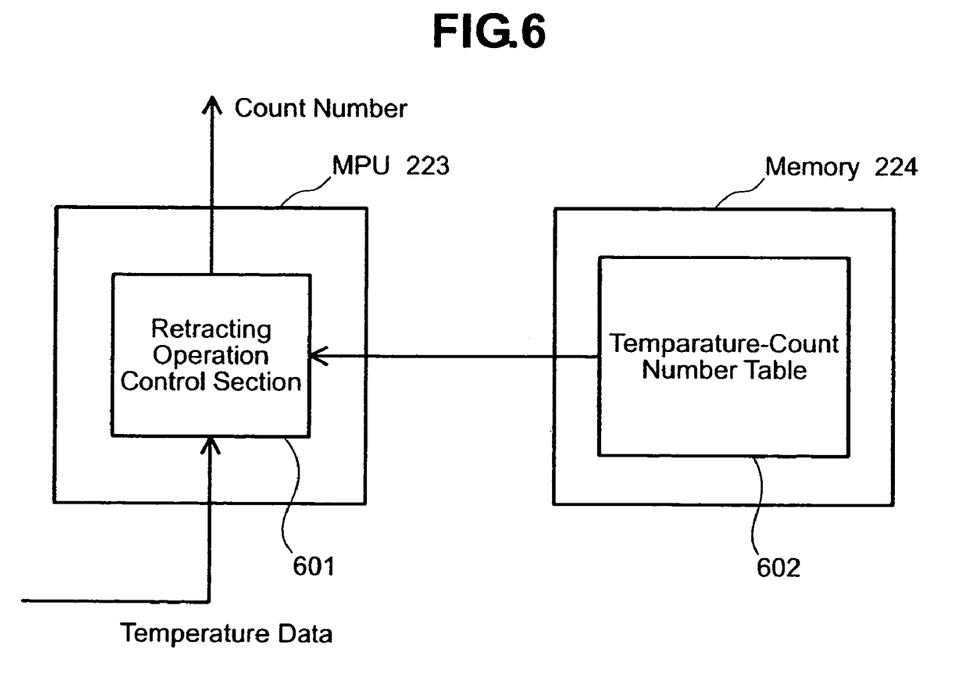
FIG. 6 is a block diagram showing a logical configuration to generate a count number in the embodiment.

FIG. 6 is a block diagram to explain how the discharge period control data set in the register 403 is generated. The discharge period control data is generated by the MPU 223 according to the firmware and set to the register 403. When generating the discharge period control data, the MPU 223 functions as a retracting operation control section 601. In this embodiment, the retracting operation control section 601 generates a count number, which is an example of the discharge period control data, based on the temperature detected by the thermistor 225. The thermistor 225 outputs a temperature signal which depends on the detected temperature. The temperature signal is AD-converted by the ADC 226 and passed as temperature data to the retracting operation control section 601. In addition, a temperature-count number table 602, which is consulted by the retracting operation control section 601, is stored in the memory 224. In the temperature-count number table 602, each count number to be set to the register 403 is stored in association with the corresponding temperature data from the thermistor 225.

Figure 7:
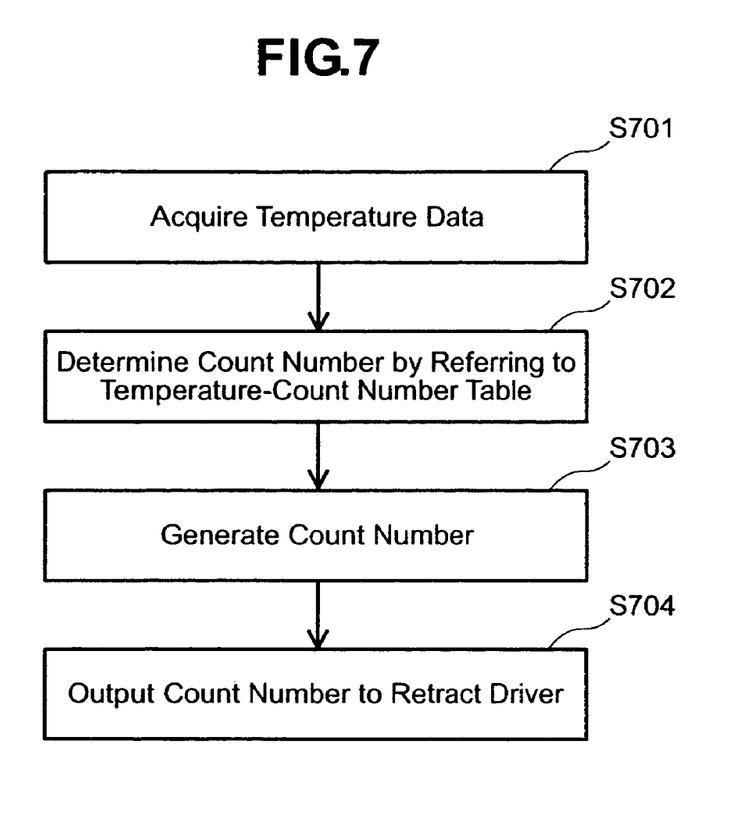
FIG. 7 is a flowchart of processing to generate a count number in the embodiment.

With reference to FIG. 7, the following describes how the discharge period control data is generated by the retracting operation control section 601. At a timing before the magnetic head 106 begins to be loaded, the retracting operation control section 601 acquires the temperature data detected by the thermistor 225 (S701). By referring to the temperature-count number table 602 stored in the memory 224, the retracting operation control section 601 determines what count number is associated with the acquired temperature data (S702). The retracting operation control section 601 generates the count number as the discharge period control data (S703) and outputs it to the retract driver 229 (S704). The count number generated by the retracting operation control section 601 is set to the register 403 in the retract driver 229.

If the setting of the retract driver 229 is executed while the magnetic head 106 is above the magnetic disk 103, there is the possibility that the power supply may be interrupted while the setting is being executed. It is therefore preferable that the retracting operation control section 601 generates the count number and sets it to the register 403 while the magnetic head 106 is in the refuge location. Preferably, the setting is done at timing before the actuator 104 begins to be loaded. It is also preferable that the retracting operation control section 601 sets a count number to the register 403 each time the actuator 104 is loaded. This can reduce the difference between the temperature associated with the count number set to the register 403 and the temperature the drive would have when the power supply to the drive is interrupted. Note that it is preferable to execute the count number setting processing at the load timing, it is also possible to execute the count number setting processing at each timing defined by the clock. In addition, the setting processing may be designed to be done while the magnetic head 106 is above the magnetic disk 103.

Figure 8:
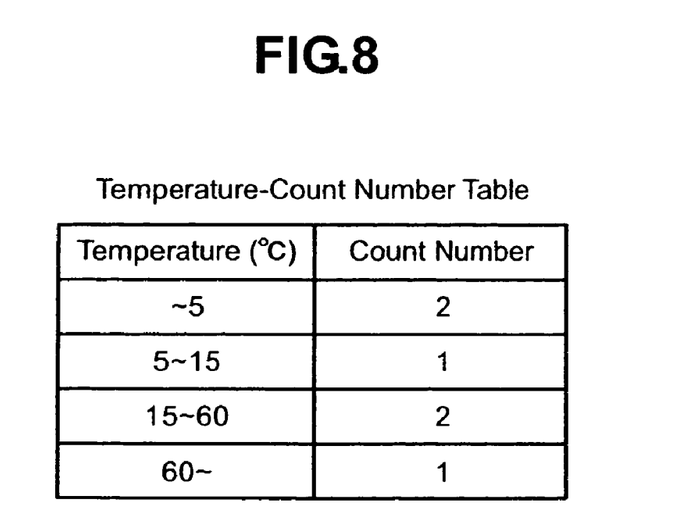
FIG. 8 is a specific example of a temperature-count number table in the embodiment.

FIG. 8 shows a specific example of the temperature-count number table 602. The temperatures to be detected by the thermistor 225 are recorded as a plurality of temperature divisions each of which has a prescribed width and is associated with a count number. In this embodiment, there are four temperature divisions which respectively represent temperatures lower than 5° C., those not lower than 5° C. and lower than 15° C., those not lower than 15° C. and lower than 60° C. and those not lower than 60° C. In addition, the lower-than-5° C., 5° C. to 15° C., 15° C. to 60° C. and beyond-60° C. divisions are respectively associated with count numbers 2, 1, 2 and 1.

Figure 9:
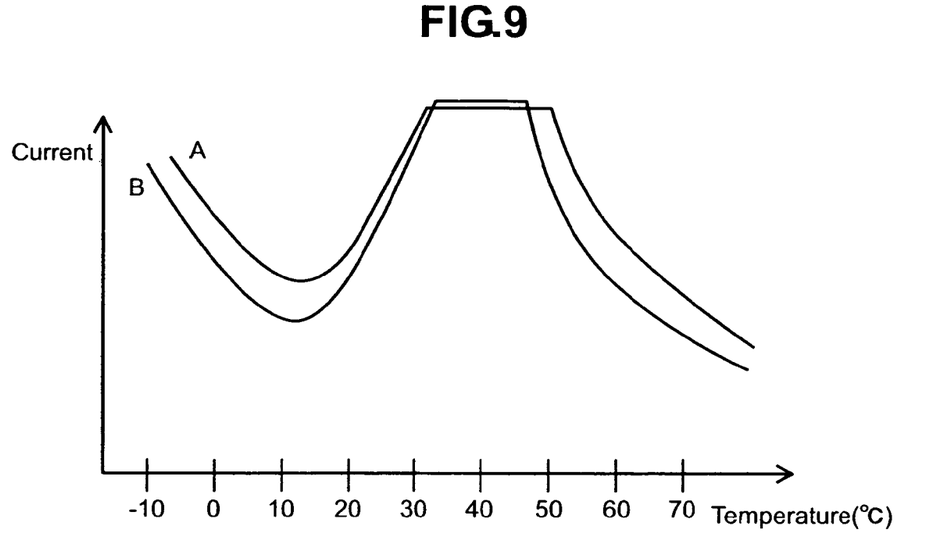
FIG. 9 shows how the current required to cause a given amount of bounce of an actuator from an outer crash stop is dependent on the temperature.

FIG. 9 shows a relation between the temperature and the current required to cause a given amount of bounce of the actuator 104 from the outer crash stop 110. As indicated, the lower the current is, the more the actuator 104 is bounded, whereas the higher the current is, the less the actuator 104 is bounded. Currents A and B shown as examples in FIG. 9 are plotted according to measurement in different hard disk drives. As understood from FIG. 9, the required current is high at low temperatures and decreases as the temperature rises. The required current begins to increase at around 10° C. and is almost constant between about 30° C. and about 60° C. If the temperature rises further, the required temperature decreases. That is, the current required to cause a given amount of bounce of the actuator 104 from the outer crash stop 110 is high below 0° C. and decreases as the temperature rises until it begins to increase at a certain temperature. If the temperature further rises, the current decreases beyond a certain temperature.

The aforementioned current change can be explained by considering the elastic modulus of the outer crash stop 110 and the mechanical friction force acting on the actuator 104. At low temperatures, the elastic modulus of the outer class stop 110 is low while the mechanical friction force is large. Below 0° C., since the mechanical friction force has larger influence than the elastic modulus of the outer crash stop 110, more current is required. As the temperature rises, the current gradually reduces since the mechanical friction force becomes smaller, making the elastic modulus of the outer crash stop 110 more influential. The current increase starting at around 10° C. may be attributable to the elastic modulus of the outer crash stop 110 which becomes lower according as the temperature rises. If the temperature rises further, the current reduces since the mechanical friction force becomes dominantly influential and it becomes smaller.

The temperature-count number table 602 was determined based on the relation between the elastic modulus of the outer crash stop 110 and the mechanical friction force acting on the actuator. As understood from FIG. 9, the bouncing amount is small between about 5° C. and 15° C. and beyond about 60° C. Therefore, the 5° C. to 10° C. and beyond 60° C. temperature divisions are associated with a larger count number than the other divisions. Note that although the temperatures are classified into four divisions, the number of divisions may be modified according to the design. Since the hard disk drive of the present embodiment controls the power to move the actuator 104 according to the temperature as mentioned above, it is possible, particularly in the retracting operation, to prevent the magnetic head 106 from dropping to the magnetic disk 113 by coping with the dependence of the actuator's bouncing amount upon the temperature.

Figure 10:
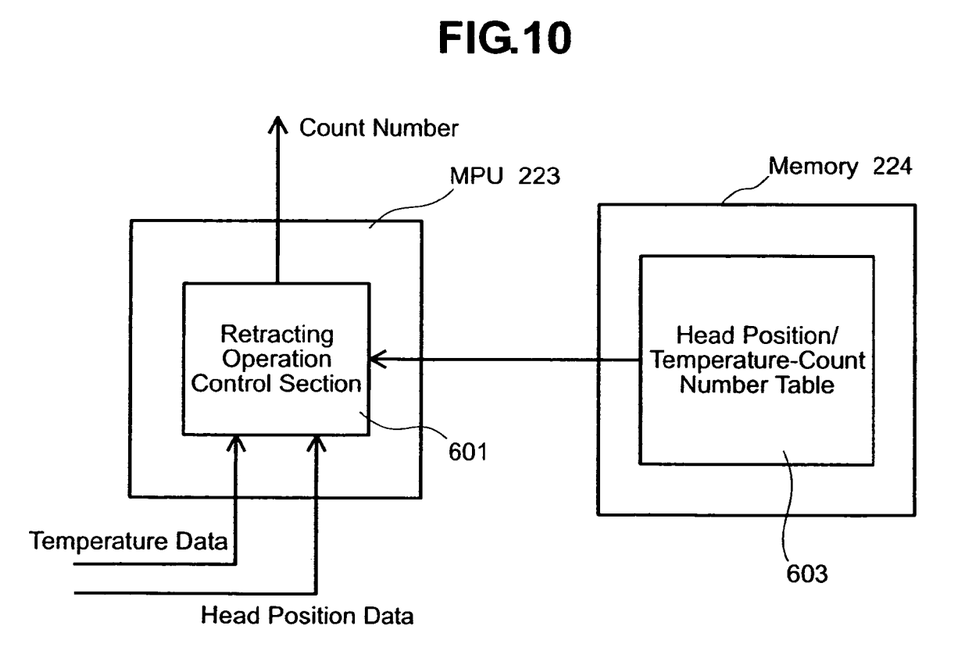
FIG. 10 is a block diagram showing a logical configuration to generate a count number in another embodiment.

The following describes a specific example of the discharge period control data generation processing. FIG. 10 is a block diagram to explain how the discharge period control data set to the register 403 is generated. In this example, the retracting operation control section 601 generates the discharge period control data based on the temperature detected by the thermistor 225 and the position of the magnetic head 106. The head position data can be acquired from the servo controller 227. The servo controller 227 extracts servo data from the read data acquired from the read/write channel 221. Of the servo data, track data is used in this example.

Since the track data identifies a track number, it is possible to recognize the present position of the magnetic head 106 or the distance of the ramp 112 from the present position of the magnetic head 106. As the distance between the magnetic head 106 and the ramp 112, the power required to retract the actuator 104 increases. This means that the retracting operation can be executed more surely by controlling the retract current discharge period based on the track data. In addition, as mentioned above, the power to set the actuator 104 to the retract position in the ramp 112 is also much dependent on the temperature as well as the distance between the magnetic head 106 and the ramp 112. Therefore, in this example, the retract period is determined based on both temperature and head position.

Figure 12:
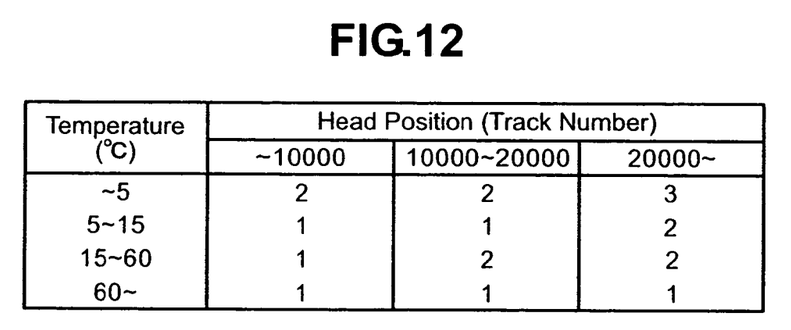
FIG. 12 is a specific example of a temperature/head position-count number table in the embodiment.

The memory 224 stores a temperature/head position-count number table 603 in which count numbers are registered in combination with temperatures and head positions. Typically, temperatures and head positions are respectively registered as a plurality of divisions each of which has a predetermined width. In order that a count number can be determined from a recognized temperature and head position, the temperature/head position-count number table 603 may be edited as a matrix table arranged in head position X items and temperature Y items. FIG. 12 shows a specific example of the temperature/head position-count table. Count numbers are determined according to four temperature divisions and three head position divisions. If the distance between the head and the ramp increases to a higher head position division while the temperature remains in the same temperature division, a higher count number may be given.

More specifically, for the lower-than-5° C. temperature division, a count number 2 is assigned to the less-than-10000 head position division, a count number 2 is also assigned to the 10000 to 20000 head position division and a count number 3 is assigned to the beyond-20000 head position division. For the 5 to 15° C. temperature division, a count number 1 is assigned to the less-than 10000 head position division and to the 10000 to 20000 head position division and a count number 2 is assigned to the beyond 20000 head position division. For the 15 to 60° C. temperature division, a count number 1 is assigned to the less-than 10000 head position division, a count number 2 is assigned to the 10000 to 20000 head position division and a count number 2 is also assigned to the beyond-20000 head position division. For the beyond-60° C. temperature division, a count number 1 is assigned to the less-than 10000 head position division, a count number 1 is also assigned to the 10000 to 20000 head position division and a count number 1 is also assigned to the beyond-20000 head position division.

Figure 11:
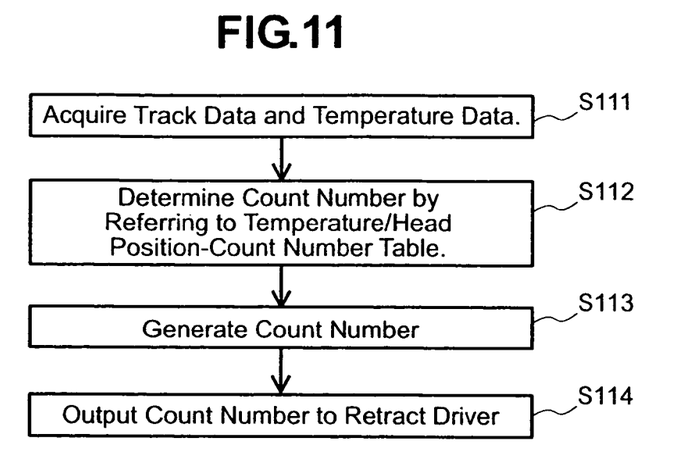
FIG. 11 is a flowchart of processing to generate a count number in the embodiment.

The following describes how the discharge period control data is generated by the retracting operation control section 601 with reference to FIG. 11. The retracting operation control section 601 acquires track data about the magnetic head 106 at timing when the magnetic head 106 reads servo data recorded on the magnetic disk 103. Preferably, the track data is acquired each time new servo data is read after the position of the magnetic head 106 is changed. Further, the retracting operation control section 601 acquires temperature data detected by the thermistor 225 (S111).

By referring to the temperature/head position-count number table 603 recorded in the memory 224, the retracting operation control section 601 determines a count number which is associated with the acquired track data and temperature data (S112). The retracting operation control section 601 generates the count number as the discharge period control data (S113) and outputs it to the retract driver 229 (S114). The count number generated by the retracting operation control section 601 is set to the register 403 in the retract driver 229. In this embodiment, since the retracting operation power to be supplied to the actuator 104 is determined based on the head position and temperature, it is possible to more surely set the magnetic head to the refuge location of the ramp 112, that is, to more surely prevent the magnetic head 106 from dropping to the magnetic disk 103.

The power to move the actuator 104 is calculated by integrating the current with respect to time. Accordingly, to use larger power for the retraction, the retract period (Tr) for which the retract current is to be discharged is set longer as indicated by a dotted line in FIG. 5. By changing the retract current discharge period, the control section 404 can effectively control the power which retracts the actuator 104 to the ramp in the retracting operation. This makes it possible to more surely retract the magnetic head 106 to such a retract position as the ramp 196 by preventing the magnetic head 106 from dropping to the magnetic disk 106. Note that the control section 404 may also be configured in such a manner that it determines the count number by performing predetermined arithmetic processing on the control data stored in the register 403. For example, the retract period can be determined by adding the set count number to a default count number.

Note that although in the above embodiment, the power to retract the actuator 104 is controlled through the time during which the current flows, the design may be modified in such a manner that the power to move the actuator 104 is controlled by changing the level of the current. Also note that not limited to the retracting operation, the control of the actuator 104 according to the temperature or head position can also be applied to the normal operation of the actuator 104. Also not limited to ramp load type hard disk drives, the control of the actuator 104 according to the temperature or head position can be applied to other types of hard disk drives within the scope of the present invention. Not limited to hard disk drives, the present invention can be applied to other types of data storage devices.

Figure 13:
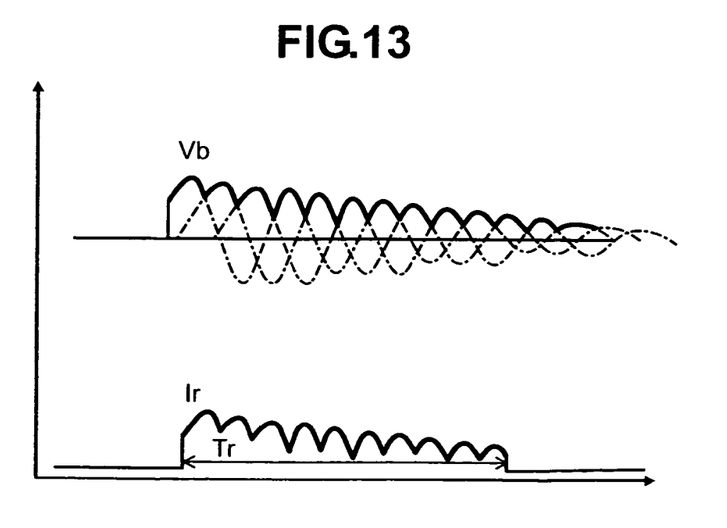
FIG. 13 is depicted for a retracting operation utilizing a spindle motor and shows how the retract current and the back electromotive voltage of the spindle motor change with time.

A hard disk drive to which the present invention is applied is not required to supply retracting operation power to the actuator 104 from the retract capacitor 408. It is also possible to either use the back electromotive force of the spindle motor 102 instead of the retract capacitor 408 or use the back electromotive force together with the power supplied from the retract capacitor 408. For example, FIG. 13 is depicted for a hard disk drive which uses the back electromotive force of the spindle motor 102, showing relations among the retract current (Ir), the retract period Tr during which the retract current is given to the voice coil 107 and the back electromotive force (Vb) of the spindle motor 102. The back electromotive force (Vb) of the spindle motor 102 is given as an oscillating voltage and therefore the retract current (Ir) also oscillates according to it. The present invention is particularly effective if the back electromotive force of the spindle motor 102 becomes not large enough to stop the actuator 104 on the ramp 112 after bounded by the outer stop 110.

Figure 14:
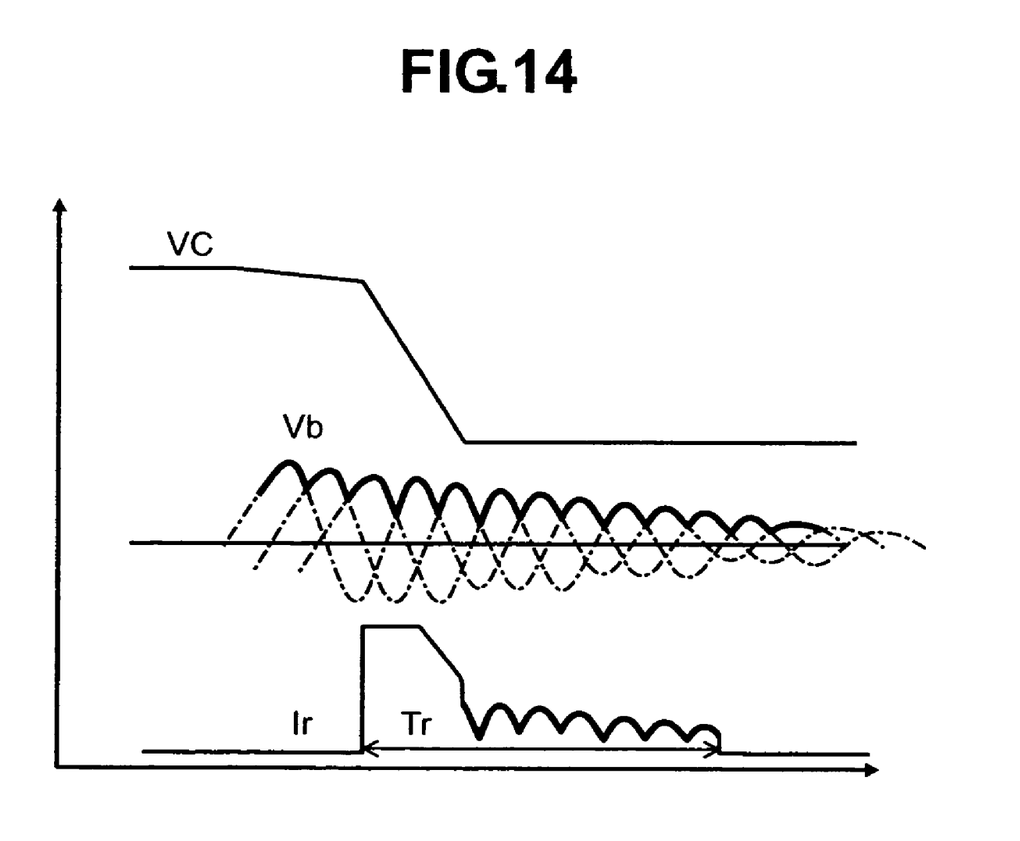
FIG. 14 is depicted for a retracting operation utilizing a spindle motor and a retract capacitor and shows how the retract current, the back electromotive force of the spindle motor and the voltage of the retract capacitor change with time.

On the other hand, FIG. 14 is depicted for a hard disk drive which uses the back electromotive force of the spindle motor 102 together with the power supplied from the retract capacitor 408, showing relations among the retract current (Ir), the retract period Tr during which the retract current is given to the voice coil 107 and the back electromotive force (Vb) of the spindle motor 102. In this example shown in FIG. 14, the voltage of the retract capacitor 408 mainly supplies the retract current during the first half of the retract period Tr whereas the back electromotive force of the spindle motor 102 mainly causes the retract current during the second half of the retract period Tr. By using both the back electromotive force of the spindle motor 102 and the retract capacitor 408, it is possible to make the retracting operation more reliable. Or using both the back electromotive force of the spindle motor 102 and the retract capacitor 408 allows the retract capacitor 403 to be made smaller.

What is claimed is:

1. A data storage device provided with a medium to store data, comprising:
   a head configured to perform at least one of reading data from the medium and writing data to the medium;
   an actuator which holds the head and operates so as to move the head to a target position;
   a temperature detecting section to detect temperature; and
   an actuator control section which, on the basis of the temperature detected by the temperature detecting section, controls power to operate the actuator;
   wherein the actuator:
   in a first temperature range, is driven with a first operation power;
   in a second temperature range higher than the first temperature range, is driven with a second operation power smaller than the first operation power; and
   in a third temperature range higher than the second temperature range, is driven with a third operation power larger than the second operation power.

2. A data storage device according to claim 1, wherein in an operation to move the actuator to a retract region, the actuator control section controls the power to operate the actuator on the basis of the detection temperature detected by the temperature detecting section.

3. A data storage device according to claim 2, further comprising a ramp formed in the retract region to stop the actuator thereon;
   wherein, in the operation to move the actuator to the retract region, the actuator control section controls the power to operate the actuator on the basis of the detection temperature so that the actuator is stopped on the ramp.

4. A data storage device according to claim 3, further comprising a crash stop against which the actuator collides in the operation to move the actuator to the retract region;
   wherein the actuator control section controls the power to operate the actuator on the basis of the detection temperature so that the actuator is stopped on the ramp after bounded by the crash stop.

5. A data storage device according to claim 1, wherein:
   the actuator has a voice coil which swings the actuator around a pivot when a current is supplied to the voice coil; and
   the actuator control section controls the power to operate the actuator by changing a time period for which the current is to be supplied to the voice coil, on the basis of the detection temperature.

6. A data storage device according to claim 5, further comprising a capacitor adapted to accumulate an electric charge therein;
   wherein the actuator control section controls the current to be supplied to the voice coil from the capacitor.

7. A data storage device according to claim 1, wherein in a retracting operation to move the actuator to the retract region if the power supply to the data storage device is interrupted, the actuator control section controls the power to operate the actuator on the basis of the detection temperature detected by the temperature detecting section.

8. A data storage device according to claim 5, further comprising a control data generating section which generates control data used to control a time period for which a current is to be supplied to the voice coil on the basis of the detection temperature detected by the temperature detecting section;
   wherein the actuator control section includes a counter and a memory unit to store the control data therein, and controls the time period for which the current is supplied to the voice coil on the basis of a count number determined according to the control data and a count signal from the counter.

9. A data storage device according to claim 8, wherein the control data is generated and stored in the memory unit in the actuator control section before the actuator is moved from the retract region to the data storage region on the medium.

10. A data storage device according to claim 1, wherein in a fourth temperature range higher than the third temperature range, the actuator is driven with a fourth operation power smaller than the third operation power.

11. A data storage device according to claim 1, further comprising a head position detecting section adapted to detect a position of the head;
    wherein the actuator control section controls the power to operate the actuator on the basis of the detection temperature detected by the temperature detecting section and the head position detected by the head position detecting section.

12. A data storage device provided with a medium to store data, comprising:
    a head configured to perform at least one of reading data from the medium and writing data to the medium;
    an actuator which holds the head and operates so as to move the head to a target position;
    a temperature detecting section to detect temperature; and
    an actuator control section which, on the basis of the temperature detected by the temperature detecting section, controls power to operate the actuator;
    wherein the actuator:
    in a first temperature range, is driven with a first operation power;
    in a second temperature range higher than the first temperature range, is driven with a second operation power larger than the first operation power; and
    in a third temperature range higher than the second temperature range, is driven with a third operation power smaller than the second operation power.

13. An actuator control method for moving an actuator to a retract position in a data storage device in which said actuator holds and moves a head to a target position, said method comprising:
    detecting temperature;

based on the detected temperature, determining the power to operate the actuator; and driving the actuator with the determined operation power so as to move the actuator to the retract position;

wherein the actuator:

in a first temperature range, is driven with a first operation power;

in a second temperature range higher than the first temperature range, is driven with a second operation power smaller than the first operation power; and in a third temperature range higher than the second temperature range, is driven with a third operation power larger than the second operation power.

14. An actuator control method according to claim 13 wherein said determining the power to operate the actuator determines a time period for which a current is to be supplied.

15. An actuator control method according to claim 13, further comprising detecting interruption of the power supply to the data storage device;

wherein the actuator is moved to the retract position in response to the detection of the interruption of the power supply to the data storage device.

16. An actuator control method according to claim 13, further comprising detecting a head position of the head;

wherein said determining the power to operate the actuator determines the operation power of the actuator on the basis of the detected temperature and head position.

17. An actuator control method according to claim 13 wherein:

said determining the power to operate the actuator includes referring to a table stored in a memory and determining control data associated with the detected temperature;

said driving the actuator includes acquiring a counter signal from a counter, and acquiring the control data; and the actuator is driven for a time period determined based on the counter signal and the control data.

18. An actuator control method according to claim 13, wherein in a fourth temperature range higher than the third temperature range, the actuator is driven with a fourth operation power smaller than the third operation power.

19. A data storage device provided with a medium to store data thereon, comprising:

a head configured to perform at least one of reading data from the medium and writing data to the medium;

an actuator which holds the head and is turned so as to move the head to a target position;

a ramp to which the actuator is retracted;

a crash stop to restrict a turning range of the actuator;

a temperature detecting section to detect temperature; and an actuator control section which controls power to operate the actuator on the basis of the temperature detected by the temperature detecting section so that the actuator is stopped on the ramp, in an operation to retract the actuator to the ramp by turning the actuator against the crash stop if the power supply to the data storage device is interrupted;

wherein the actuator:

in a first temperature range, is driven with a first operation power;

in a second temperature range higher than the first temperature range, is driven with a second operation power smaller than the first operation power; and in a third temperature range higher than the second temperature range, is driven with a third operation power larger than the second operation power.

20. A data storage device according to claim 19, wherein in a fourth temperature range higher than the third temperature range, the actuator is driven with a fourth operation power smaller than the third operation power.

* * * * *